Nov. 10, 1925.

J. G. JONES 1,560,579

SUCTION CONVEYER FOR SHEET MATERIAL

Filed Nov. 23, 1923

INVENTOR,
John G. Jones,
BY
ATTORNEYS.

Patented Nov. 10, 1925.

1,560,579

UNITED STATES PATENT OFFICE.

JOHN G. JONES, OF ROCHESTER, NEW YORK, ASSIGNOR TO EASTMAN KODAK COMPANY, OF ROCHESTER, NEW YORK, A CORPORATION OF NEW YORK.

SUCTION CONVEYER FOR SHEET MATERIAL.

Application filed November 23, 1923. Serial No. 676,635.

*To all whom it may concern:*

Be it known that I, JOHN G. JONES, a citizen of the United States of America, residing at Rochester, in the county of Monroe and State of New York, have invented certain new and useful Improvements in Suction Conveyers for Sheet Material, of which the following is a full, clear, and exact description.

This invention relates to conveyers, and particularly to conveyers which will definitely hold web material being moved by the conveyer against displacement. One object of my invention is to provide a substantially frictionless conveyer which will move, without marring, the most delicate web material. Another object is to provide a conveyer which may be made to follow any desired path, and which will remain permanently in that path. Another object is to provide a conveyer with which a sheet or long depths of web material will be definitely held against the conveyer regardless of the path of the conveyer, and other objects will appear hereinafter in the specification, the novel features being pointed out in the claims at the end thereof.

I am aware that rollers alone have been used for conveyers and that in some instances, series of intermeshing rollers have also been used. My invention, however, broadly comprises using rollers as an antifriction device in connection with a vacuum chamber adapted to draw air through the rollers to hold web material against the conveyer.

I have selected for illustrating my invention a turtle-back against the concave side of which a web W of material is to be carried against the action of gravity. I have shown only the essential features of the conveyer for clearness, and have exaggerated the size of the rollers relative to the turtle back.

The web W which may be of any desired material, may have a base B upon which there is a sensitized coating S. This sensitiveness may be due to damp ink, paint or dye, a photographic emulsion, a gelatine coating or any other coating which has not yet set, which may be marred or damaged if it comes in contact with a support. Obviously so long as the base B rests on the conveyer through gravity or because of tension applied to the web the sensitized coating S will not become damaged. When, however, it is desirable to carry the material through a path in which it can not be so held a special type of conveyer is necessary.

Figure 2:
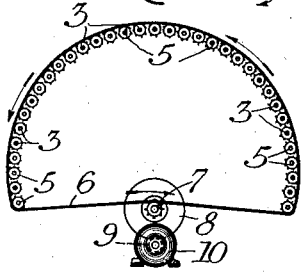
Fig. 2 is a diagrammatic side elevation of the power driven shafts used in Fig. 1.
Figure 4:
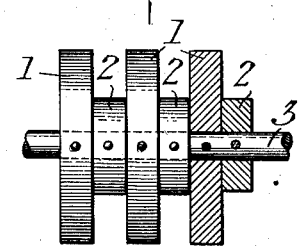
Fig. 4 is an enlarged fragmentary elevation of a preferred form of roller construction.

One form of my conveyer consists of a plurality of rollers or spools with alternate large rollers 1 and small rollers 2 mounted to turn with shafts 3 carried by suitable bearings 4 (only one being shown) and being driven by sprockets 5 which are moved by a chain 6. This chain, as shown in Fig. 2 may be driven by a sprocket 7 through gears 8 and 9 by the motor 10. There is thus formed a path of antifriction members through which sheet material may be conducted as will be hereinafter described.

Figure 1:
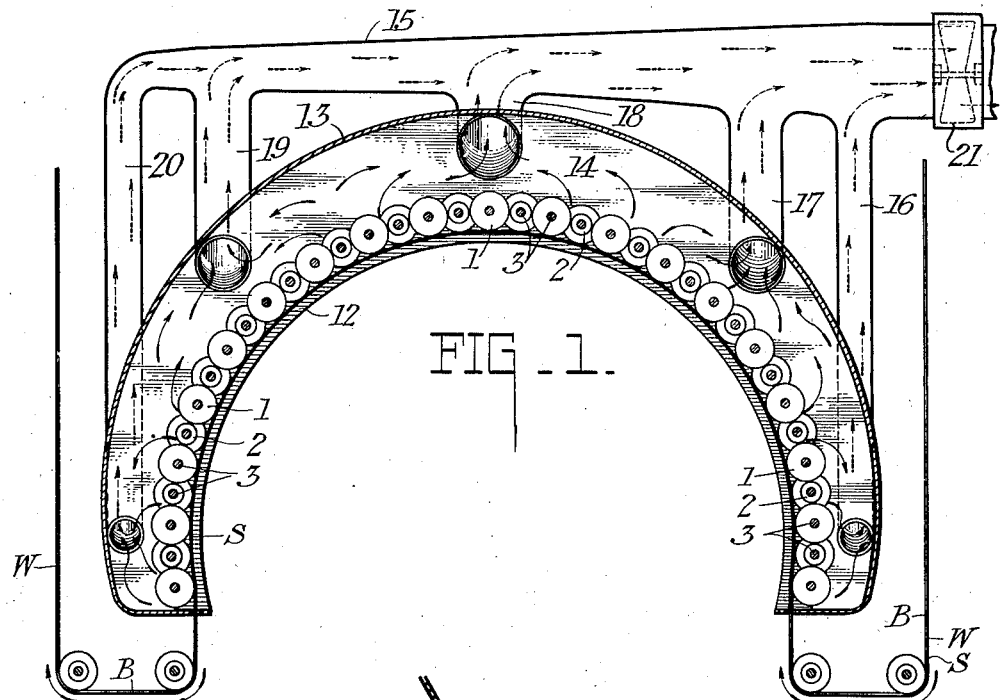
Fig. 1 is a section through a conveyer constructed in accordance with and illustrating one form of my invention.
Figure 3:
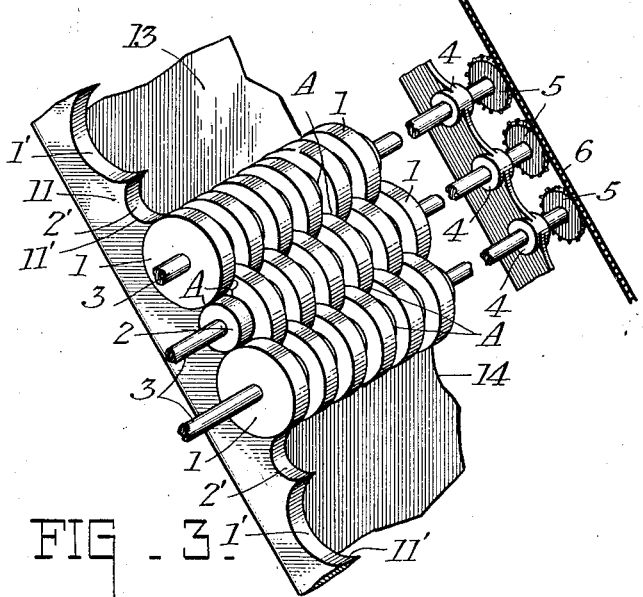
Fig. 3 is an enlarged fragmentary perspective of a portion of the conveyer.

On the outside row of rollers, as shown in Fig. 3, there is a partition edge plate 11 having an edge 11', with concave portions 1' and 2' conforming closely to the rollers. A similar plate 12 is on the opposite side of the conveyer and these plates are connected by a wall 13 to form a substantially air tight suction chamber 14. Air is exhausted by the exhauster 21 through a main pipe 15 to which supplementary pipes 16, 17, 18, 19 and 20 may be connected to draw the air evenly from all parts of the chamber 14. The rollers actually form one wall of the air chamber.

The large rollers 1 and small rollers 2 are made so as to intermesh, closely fitting to each other (Fig. 3) and yet permitting air to be drawn between them at the interstices A. The suction retains the web W upon the conveyer and as the rollers are rotated, the web is moved smoothly with a minimum amount of friction. The most delicate base B will not be injured by the conveyer, as the peripheral speed of the rollers is the speed at which the sheet is moved; and as the sensitive side S is never in contact with any part of the machine it is not injured in any way.

Figure 5:
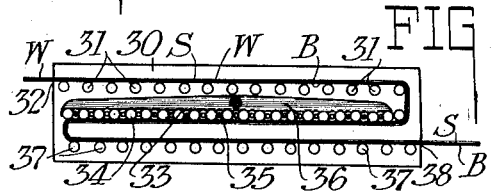
Fig. 5 is a diagrammatic side elevation of a second embodiment of my invention.

There are many applications for my invention. Another embodiment is shown in the dryer 30 of Fig. 5, where the web may be passed through the drier upon rollers 31, lying thereagainst through gravity, then it may be carried toward the entrance opening 32 by a conveyer 33 having rollers 34 and 35, and suction chamber 36, after which it may pass over rollers 37 and out through an exit 38. Such a drier may be made much shorter than is usually the case. In addition the air suction facilitates drying as the air is drawn against the sheet material and through the conveyer.

In threading a long web to start through the conveyer it is not necessary to cover up the conveyer first to prevent loss of suction, as the end of the web B may be placed over the nearest roller, after which it will roll along the conveyer without further attention. Sheets of material, even small sizes can be successfully carried without falling or blowing from the conveyer. This type conveyer above described can be used in connection with the automatic film spooling machine shown in my pending application filed May 31, 1923, Serial No. 642,398, where the conveyers shown in the drawings as 8, 11 and 40 may be of this type.

Since there are so many applications to which my invention may be applied I do not wish to limit myself to the forms shown in the drawings by way of illustration, but contemplate as within the scope of my invention all such forms as may fall within the scope of the appended claims.

Having thus described my invention, what I claim as new and desire to secure by Letters Patent is:

1. In a conveyer for sheet material, the combination with a plurality of intermeshed conveyer rollers, some rollers being of greater diameter than others, and arranged with their peripheries lying close to each other whereby interstices are left between the rollers, said rollers forming one wall of a suction chamber associated with the rollers, and means for drawing air through the interstices between the rollers to hold material being conveyed against the rollers.

2. In a conveyer for sheet material the combination with a plurality of intermeshed rollers mounted closely together with interstices therebetween, a power drive through which the rollers are actuated, and means associated with one side of the rollers for drawing air through the interstices between the rollers whereby a sheet lying upon the rollers will be moved and held against the moving rollers by suction.

3. In a conveyer for sheet material the combination with a set of relatively large rollers, of a set of relatively small rollers intermeshing with the large rollers forming a pathway along which a sheet of material is to be conducted, the two sets of rollers having interstices between the intermeshing parts, a power drive for the relatively large rollers, and means associated with one side of the rollers tending to draw air through the interstices of the rollers whereby sheet material may be moved by the power driven rollers and retained upon the rollers the air being drawn through the interstices.

4. In a conveyer for sheet material, the combination with a plurality of movable members having interstices therebetween, of a suction chamber, the movable members forming one wall of the suction chambers through which air may be drawn, the other walls of the suction chamber associated with the front wall being substantially air tight, means tending to exhaust air from the suction chamber whereby sheet material may be retained on the movable members, and means for actuating the movable members, whereby the sheet material so retained may be moved.

5. In a conveyer for sheet material the combination with a suction box comprising a plurality of fixed walls, and a wall consisting of a plurality of rollers having an overlapping relation with respect to each other, said rollers having their walls separated to provide interstices through which air may be drawn, two walls of the suction box having an edge shaped to conform with the shape of the rollers, whereby a substantially air tight edge for the suction box is produced.

6. In a conveyer for sheet material the combination with a suction box comprising a plurality of fixed walls, and a wall consisting of a plurality of rollers the rollers being of different diameters intermeshed with each other to provide a plurality of interstices between the rollers, walls of the suction box having a plurality of curved edges for closely conforming to the shape of the rollers and for forming a substantially air tight joint therewith, and means for drawing air from the suction box, whereby material may be held upon the rollers.

Signed at Rochester, New York, this 20th day of November, 1923.

JOHN G. JONES.